No. 813,884. PATENTED FEB. 27, 1906.
G. O. HADFIELD.
MACHINE FOR SPINNING AND TWISTING FIBROUS MATERIALS.
APPLICATION FILED JUNE 21, 1904.
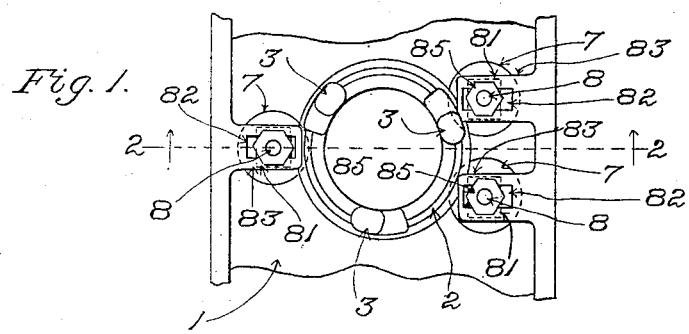
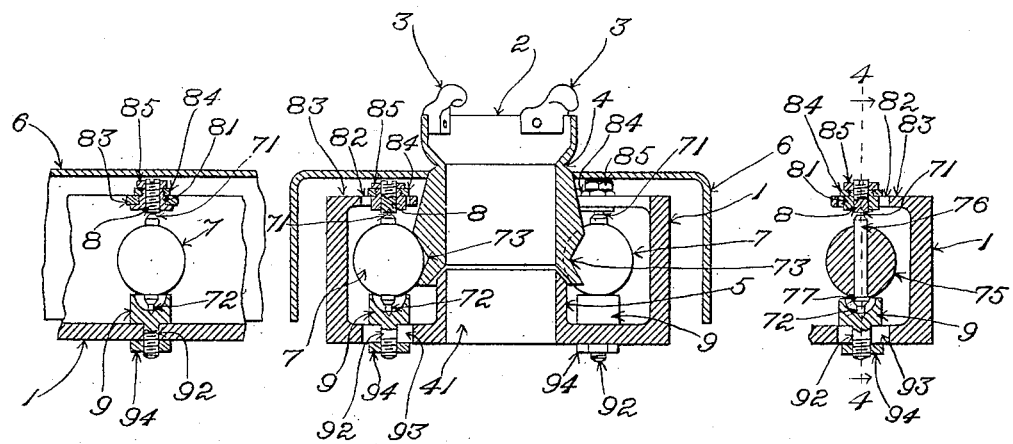
Fig. 4. Fig. 2. Fig. 3.
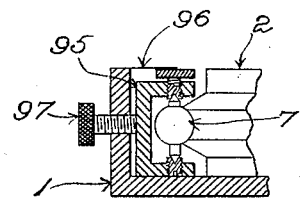
Fig. 6.
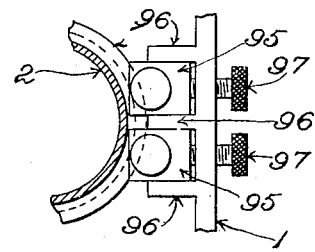
Fig. 7.
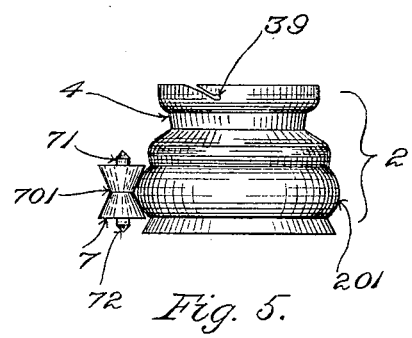
Fig. 5.
Witnesses:
Oscar F. Hill
Alice Tarr
Inventor:
George O. Hadfield
By Macleod Calvert & Randall
Attorneys.

UNITED STATES PATENT OFFICE.

GEORGE O. HADFIELD, OF FALL RIVER, MASSACHUSETTS

MACHINE FOR SPINNING AND TWISTING FIBROUS MATERIALS.

No. 813,884.      Specification of Letters Patent.      Patented Feb. 27, 1906.

Application filed June 21, 1904. Serial No. 213,483.

*To all whom it may concern:*

Be it known that I, GEORGE O. HADFIELD, a citizen of the United States, residing at Fall River, in the county of Bristol, State of Massachusetts, have invented a certain new and useful Improvement in Machines for Spinning and Twisting Fibrous Materials, of which the following is a specification, reference being had therein to the accompanying drawings.

In certain classes of machines for spinning and twisting fibrous materials rotatable rings having suitable thread-guides and provided with power connections, by means of which they are driven at the required high rate of speed, are employed in lieu of the fliers heretofore commonly in use. It has been ascertained from practical experience that in order to enable such rings to be successfully employed the supports and bearings therefor must be such as to hold the ring in place during its working with freedom from vibration and permit the same to rotate at the required speed with a minimum of friction and wear. Ordinary bearings cannot successfully be employed, owing to the high speed which is imparted to the rings and to the difficulty of keeping the relatively moving contacting surfaces properly lubricated.

The objects of my invention are in general to improve upon the supports and bearings which heretofore have been employed in connection with rotating rings such as aforesaid and, more especially, to provide a construction in which the frictional resistance to the rotation of the ring and the wear shall be reduced almost to nothing and in which the lubrication of the contacting surfaces shall be conveniently and automatically effected, complete lubrication being effected with the use of a minimum quantity of lubricant.

The invention pertains to that class of supporting and bearing devices for rotating rings which are characterized by the employment of antifriction wheels, rolls, and the like. Various contrivances of this class have been proposed heretofore; but they are all subject to different practical defects and disadvantages, which I have aimed in the present invention to entirely obviate. The antifriction-supports of my invention are subject to less friction and wear than the devices of the same general character which heretofore have been proposed and tried, they are far more readily lubricated and kept adequately lubricated during their operation, and they enable a ring to be driven at a higher speed with less expenditure of power than heretofore has been found possible.

The invention is illustrated in the accompanying drawings, in which—

Figure 1 shows in plan portion of the ring-rail of a spinning or twisting machine and a ring with one embodiment of the invention applied to the said parts, the cover of the ring-rail being removed. Fig. 2 is a view mainly in vertical transverse section on the dotted line 2 2 in Fig. 1. Fig. 3 is a detail view showing one of the antifriction-rolls and its supports in vertical section at right angles to the width of the rail. Fig. 4 is a detail view, in vertical section, on line 4 4, Fig. 3. Fig. 5 shows in elevation a further embodiment of the invention. Fig. 6 shows in vertical transverse section portion of a construction in which the rolls are mounted in adjustable brackets. Fig. 7 is a partial plan of the construction that is represented in Fig. 6.

Having reference more particularly to Figs. 1 to 4 of the drawings, portion of a ring-rail is shown at 1. This may be of any suitable and preferred construction in practice. In the present instance it is of a channel-like form, having raised longitudinal sides. A ring is shown at 2. It is provided in practice with one or more suitable yarn-guiding eyes or equivalent devices. One or more yarn-guides, such as those which are indicated at 3 3, Fig. 2, may be employed, if preferred, or the upper edge of the ring may be slitted, as at 39, Fig. 5. Rotary motion may be communicated to the ring in practice in any of the ways heretofore proposed or otherwise, as may be deemed most suitable. I have shown the ring provided with a peripheral groove 4, suitable for receiving a driving-band, (not necessary to be shown,) actuated in usual manner and through which rotary motion may be communicated to the ring in well-known fashion. 41 is the opening that is made vertically through the ring-rail for the spindle or other yarn-receiver, (not necessary to be shown,) which coöperates with the ring and which extends up through the latter centrally of the same. The rail preferably is formed around this opening 41 with a cylindrical boss or tubular projection 5 rising from the bottom of the rail. Supporting devices for the ring hold the latter in concentricity or substantially in concentricity with the said boss or projection, and the latter may project for a greater or less distance up within the ring. This boss or tubular projection is intended chiefly to prevent oil from reaching the yarn-receiver or its load of yarn, located at the center of the ring, and to keep the ring itself from contacting with said yarn receiver or load when being applied or adjusted or with the said yarn-load as the latter increases in diameter during operation. If deemed advisable, the boss or tubular projection 5 may be omitted. It forms no feature of the present invention. The cover of the ring-rail is marked 6.

The supporting means for the ring comprises a number of antifriction-rolls 7 7 7. Three rolls are shown in the present instance. The said rolls are mounted in manner which I shall presently proceed to explain and serve to support the ring in its working position. They hold it from movement both vertically and horizontally. The number of rolls employed in connection with the ring may vary in practice. Of the three which are shown in the drawings one is located adjacent one side of the rail and the remaining two adjacent the other side of the rail. The antifriction rolls or wheels heretofore employed in connection with rotating spinning-rings have been sleeved upon relatively fixed or dead pins or studs, the said pins or studs remaining stationary during the operation of the ring and the rolls or wheels turning upon the same. In this form of construction the pressure of the interiors of the rolls or wheels against the pins or studs upon which they turn produces a great deal of friction and a resulting proportion of wear. Owing often to the length of the bearing-surfaces and the force with which they are pressed into contact with each other, it is difficult to lubricate such surfaces. The supporting pins or studs are frequently not true or become sprung when being put into place or as a result of the strains and other exigencies or accidents which are incident to use. These causes, as well as imperfect fitting of the parts together, resulting from faulty construction, lack of skill, or carelessness, impair the working and often result in excessive friction and heating in the operation of the ring. In my invention the antifriction-rolls employed are provided at top and bottom with journals or pintles, these last having journal-bearings at the tops and bottoms thereof alone, and the bottom or step bearings are furnished with receptacles for lubricant, in which the latter is stored. A further feature of the invention is the fact that the lubricant is automatically fed by the action of the antifriction-rolls from the said receptacles to the contacting surfaces of the rolls themselves and the ring. In the preferred forms of my invention the ring and rolls are constructed and arranged so that each roll contacts with the ring at two points only.

The upper and lower journals or pintles of the respective rolls 7 7 7 are designated 71 72. The upper journal or pintle 71 is received in a bearing 8, by which latter the upper portion of the antifriction-rolls is steadied and supported. The lower journal or pintle 72 is received in a step-bearing 9. The peripheral portions of the antifriction-rolls 7 7 7 engage with the peripheral portion of the ring. In Figs. 1 to 4 the said rolls are spherical or otherwise of convex rounded form in vertical cross-section, although the precise shape in cross-section is not in itself of the essence of the invention, and enter a groove 73 in the exterior of the ring. In order to confine the contact between the ring and each roll to two points on each roll, the groove 73 in the ring is formed with upper and lower inwardly-converging walls or inclines forming tangents to the periphery of a roll at the said points of contact. By confining the contact to two points, as aforesaid, the tendency of the rolls to bind or grip in the groove of the ring is obviated, the friction and wear are greatly diminished, the working relations of the parts are more easily maintained during use and are not disadvantageously affected by wear, and the working and results are improved in other respects. In Fig. 5, in which a ring and one of the antifriction-rolls are shown, each of the rolls has the periphery thereof grooved, as at 701, and the ring is formed with an annular enlargement 201 of circular curvature in vertical cross-section working in the grooves 701 of the antifriction-rolls. The said enlargement contacts with the surface of each antifriction-roll at two points only, as in the embodiment of the invention first described. The lubricant-receptacle for each step 9 is constituted of a cup 91, with which each step is furnished, the said cup being arranged to contain lubricant in contact with the lower journal or pintle of the corresponding antifriction-roll. In operation also lubricant supplied to the oil-cup of one of the steps 9 will work along the lower journal of the corresponding antifriction-roll to the body of the said roll and during the rotation of the ring and roll will be caused by centrifugal action to pass to the outer portion of the body of the roll, thereby reaching the points of contact between the roll and the walls of the groove in the ring in which the rolls work and effecting the lubrication thereof.

The manner of applying and mounting the upper and lower bearings may vary in practice. In Figs. 1 to 4 the said bearings are applied directly to the rail. Each step 9 has an extension 92, which is received in a slot 93, that is made through the bottom of the ring-rail 1, the lower extremity of the said extension being screw-threaded and receiving thereon a nut, as 94, by means of which the step is clamped in position. The slot 93 permits the step to be adjusted transversely with respect to the ring-rail. The upper bearing 8 is constituted of a screw having the lower end thereof shaped to receive and fit the upper journal or pintle of the roll. The said screw is fitted to a screw-threaded hole through a block 81, which latter occupies a slot 82 in a lug 83, with which the adjacent upright side of the ring-rail 1 is provided. The lower portion of block 81 is flanged to bridge the said slot 82 at the under side of the lug 83, the upper portion of the block being screw-threaded and receiving a nut 84 above the lug, whereby to clamp the block in position. The slot extends transversely with respect to the ring-rail to permit of transverse adjustment of the antifriction-roll. A lock-nut 85 on the screw 8 makes contact with the top of the block 81 to prevent loss of the vertical adjustment of said screw and its bearing for the upper journal or pintle of the roll.

I have thus far been careful to describe the construction which is contained in the preferred embodiments of my invention; but it is to be understood that I do not limit myself within the scope of the invention as hereinafter defined in the claims with respect to mere features of form and arrangement. Thus in lieu of providing the antifriction-rolls with journals or pintles entering relatively fixed bearings the said rolls may be formed with upper and lower bearings receiving pivots which project from fixed supports. In Fig. 3 of the drawings I have shown a form of antifriction-roll comprising a body, as 75, engaging and coöperating with the ring in manner substantially as hereinabove set forth, and a live-spindle 76, upon which the said body is fitted with capacity to turn relatively thereto, the upper and lower extremities of the said spindle being cone-shaped and fitted to the top and bottom bearings, as in the case of the projecting journals or pintles of the form of roll first described. A shoulder at 77 upon the live-spindle determines the height at which the body 75 is supported upon said spindle. In operation the body and spindle both turn; but the body is capable of turning upon the spindle faster than the latter. Thereby the relative movement is divided between different places of bearing contact instead of all occurring at the top and bottom bearings, the action being easier and the wear less in practice. In Figs. 6 and 7 the rolls are mounted in bearings which are provided upon brackets or stands 95 95, &c. The latter are mounted between guide-lugs 96 96, &c., with which the rail 1 is furnished, and are provided with adjusting-screws 97 97, &c., by means of which the rolls may be set up against the periphery of the ring with the required closeness.

What I claim is—

1. In a machine for spinning or twisting fibrous materials, in combination, a rotating spinning-ring, a ring-rail, and antifriction-rolls on the said ring-rail rotating on vertical axes, each roll having journal-bearings at the top and bottom thereof, and the peripheral portions of said rolls engaging with the corresponding portion of the ring to support the ring both vertically and horizontally.

2. In a machine for spinning or twisting fibrous materials, in combination, a rotating spinning-ring, a ring-rail, and antifriction-rolls on the said ring-rail supporting the ring both vertically and horizontally, the said rolls rotating on vertical axes and each roll having journal-bearings at the top and bottom thereof, the periphery of each roll making contact with that of the ring at two points only.

3. In a machine for spinning or twisting fibrous materials, in combination, a rotating spinning-ring, a ring-rail, antifriction-rolls on the said ring-rail rotating on vertical axes, the peripheral portions of said rolls engaging with the corresponding portion of the ring, a step-bearing for each roll furnished with an oil-cup from which the lubricant travels under the influence of centrifugal force to the contacting portions of the rolls and ring, and an upper journal-bearing for each roll.

4. In a machine for spinning and twisting fibrous materials, in combination, a rotating spinning-ring, a ring-rail, antifriction-rolls on the said ring-rail, the said rolls rotating on vertical axes, and having the peripheral portions thereof in engagement with the corresponding portion of the ring at two points only, a step-bearing for each roll furnished with an oil-cup from which the lubricant travels under the influence of centrifugal force to the contacting portions of the rolls and ring and an upper journal-bearing for each roll.

5. In a machine for spinning or twisting fibrous materials, in combination, a rotating spinning-ring, a ring-rail, antifriction-rolls on the said ring-rail rotating on vertical axes and having the peripheral portions thereof in engagement with the peripheral portion of the ring, each roll making contact with the ring at two points only, the walls of one of the contacting peripheral portions extending tangentially with respect to the opposing peripheral portion at the points of contact, the step-bearing for each roll furnished with the oil-cup, and the upper journal-bearing for each roll.

6. In a machine for spinning or twisting fibrous materials, in combination, a rotating spinning-ring, a ring-rail, antifriction-rolls rotating on vertical axes, each roll having journal-bearings at top and bottom thereof and the peripheral portions of the rolls engaging with the corresponding portion of the ring to support the ring both vertically and horizontally, and the adjustable brackets or stands mounted upon the ring-rail and provided with the said journal-bearings.

In testimony whereof I affix my signature in presence of two witnesses.

GEORGE O. HADFIELD.

Witnesses:
SAMUEL HADFIELD,
JAMES HADFIELD.